(12) United States Patent
Hahn et al.

(10) Patent No.: US 11,789,654 B2
(45) Date of Patent: Oct. 17, 2023

(54) DATA STORAGE DEVICE AND METHOD FOR FILE-BASED INTERRUPT COALESCING

(71) Applicant: Western Digital Technologies, Inc., San Jose, CA (US)

(72) Inventors: Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/489,378

(22) Filed: Sep. 29, 2021

(65) Prior Publication Data

US 2023/0101626 A1 Mar. 30, 2023

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/0679* (2013.01); *G06F 12/0223* (2013.01); *G06F 2212/1008* (2013.01)

(58) Field of Classification Search
CPC ...... G06F 3/061; G06F 3/0659; G06F 3/0688; G06F 3/0679; G06F 13/1642; G06F 13/4282; G06F 13/1673; G06F 3/0611; G06F 13/1668; G06F 13/20; G06F 2212/7203; G06F 2212/7208; G06F 2213/0026; G06F 3/0613; G06F 11/1469; G06F 11/1662; G06F 2201/805; G06F 2201/82; G06F 3/0656; G06F 13/24; G06F 2213/2406; G06F 3/0604
See application file for complete search history.

(56) References Cited

U.S. PATENT DOCUMENTS

| | | | |
|---|---|---|---|
| 7,987,307 B2 | 7/2011 | Sarangam et al. |
| 9,720,860 B2 | 8/2017 | Rose et al. |
| 10,007,442 B2 | 6/2018 | Hahn et al. |
| 2010/0274940 A1 | 10/2010 | Ahmad et al. |
| 2011/0093637 A1 | 4/2011 | Gupta et al. |
| 2017/0336988 A1 | 11/2017 | Kim et al. |
| 2018/0275872 A1 | 9/2018 | Benisty et al. |
| 2019/0324659 A1 | 10/2019 | Benisty |
| 2020/0117623 A1 | 4/2020 | Han et al. |

OTHER PUBLICATIONS

International Search Report dated Sep. 23, 2022 for International Application No. PCT/US2022/030033.
Written Opinion dated Sep. 23, 2022 for International Application No. PCT/US2022/030033.

*Primary Examiner* — Yong J Choe
(74) *Attorney, Agent, or Firm* — Crowell & Moring LLP (57) ABSTRACT

A data storage device and method for file-based interrupt coalescing are provided. In one embodiment, a data storage device is provided comprising a memory and a controller. The controller is configured to execute a plurality of read commands read from a submission queue in a host; write a plurality of completion messages to a completion queue in the host; and coalesce interrupts to inform the host that plurality of completion messages were written to the completion queue; wherein the submission queue and the completion queue are dedicated to read commands from a host application and are separate from a submission queue and a completion queue for read and write commands from an operating system of the host. Other embodiments are possible, and each of the embodiments can be used alone or together in combination.

20 Claims, 11 Drawing Sheets

DATA STORAGE DEVICE AND METHOD FOR FILE-BASED INTERRUPT COALESCING

BACKGROUND

In some environments, a data storage device and host operate under the Non-Volatile Memory Express (NVMe) specification. NVMe is based on a paired submission and completion queue mechanism. Commands are placed by host software into the submission queue, and completions are placed into an associated completion queue by the controller of the data storage device. In operation, the host writes a command to the submission queue and then writes to a submission queue doorbell register in the data storage device to alert the data storage device to the fact that the host has queued a command in the submission queue. Once alerted, the data storage device fetches and executes the command from the submission queue. After executing the command, the data storage device sends a completion message to the relevant completion queue in the host. At this point, the host is unaware that the data storage device posted to the completion queue, so the data storage device can notify the host that there has been an update to the completion queue by sending an interrupt to the host. Responsive to receiving the interrupt, the host processes the entries from the completion queue and notifies the data storage device accordingly.

DETAILED DESCRIPTION

Overview

By way of introduction, the below embodiments relate to a data storage device and method for file-based interrupt coalescing. In one embodiment, a data storage device is provided comprising a memory and a controller. The controller is configured to execute a plurality of read commands read from a submission queue in a host; write a plurality of completion messages to a completion queue in the host; and coalesce interrupts to inform the host that plurality of completion messages were written to the completion queue; wherein the submission queue and the completion queue are dedicated to read commands from a host application and are separate from a submission queue and a completion queue for read and write commands from an operating system of the host.

In some embodiments, the controller is further configured to send the coalesced interrupts to the host in response to reading a plurality of predetermined logical block addresses.

In some embodiments, the plurality of predetermined logical block addresses are specified by the host.

In some embodiments, the plurality of predetermined logical block addresses are received from the host via a dataset management integral read command.

In some embodiments, the controller is further configured to identify the plurality of predetermined logical block addresses by creating an internal extent map.

In some embodiments, the plurality of predetermined logical block addresses are listed in a logical-to-physical address data structure.

In some embodiments, the plurality of predetermined logical block addresses are a reverse list of logical block addresses that are considered part of a same extent that should not trigger sending an interrupt.

In some embodiments, the controller is further configured to send the coalesced interrupts to the host in response to reading data that is smaller than a predetermined read size.

In some embodiments, the controller is further configured to: avoid automatically sending an interrupt to inform the host that a completion message was written to the completion queue dedicated to the host application; and send the coalesced interrupts to the host only after receiving a command from the host that triggers the sending of the coalesced interrupts.

In some embodiments, the controller is further configured to send the coalesced interrupts only after receiving the command from the host and after completing any previously-submitted read commands from the submission queue dedicated to the host application.

In some embodiments, the command from the host comprises one or more of a non-read command, a no-op command, a vendor-specific command, and an illegal command.

In some embodiments, the controller is further configured to take into consideration an interrupt coalescing parameter set by the host when coalescing the interrupts.

In some embodiments, the controller is further configured to coalesce interrupts to inform the host that a plurality of completion messages were written to the completion queue for read and write commands from the operating system of the host; and interrupts to inform the host that plurality of completion messages were written to the completion queue dedicated to the host application are coalesced differently from interrupts to inform the host that the plurality of completion messages were written to the completion queue for read and write commands from the operating system of the host.

In some embodiments, the host application comprises a game application.

In some embodiments, the memory comprises a three-dimensional memory.

In another embodiment, a method is provided that is performed in a data storage device in communication with a host comprising submission and completion queues. The method comprises executing a plurality of read commands from the submission queue; writing a plurality of completion messages to the completion queue; and delaying sending interrupts to inform the host that the plurality of completion messages were written to the completion queue until a predetermined read event occurs.

In some embodiments, the predetermined read event comprises reading an end-of-file extent.

In some embodiments, the plurality of read commands are for parts of an asset of a game application on a host and the predetermined read event comprises reading all of the parts of the asset.

In some embodiments, the submission queue and the completion queue are dedicated to read commands from an application running on the host and are separate from a submission queue and a completion queue for read and write commands from an operating system of the host.

In another embodiment, a data storage device is provided comprising: a memory; means for executing a plurality of read commands read from a submission queue in a host; means for writing a plurality of completion messages to a completion queue in the host; and means for coalescing interrupts to inform the host that plurality of completion messages were written to the completion queue; wherein the submission queue and the completion queue are dedicated to read commands from a host application and are separate from a submission queue and a completion queue for read and write commands from an operating system of the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
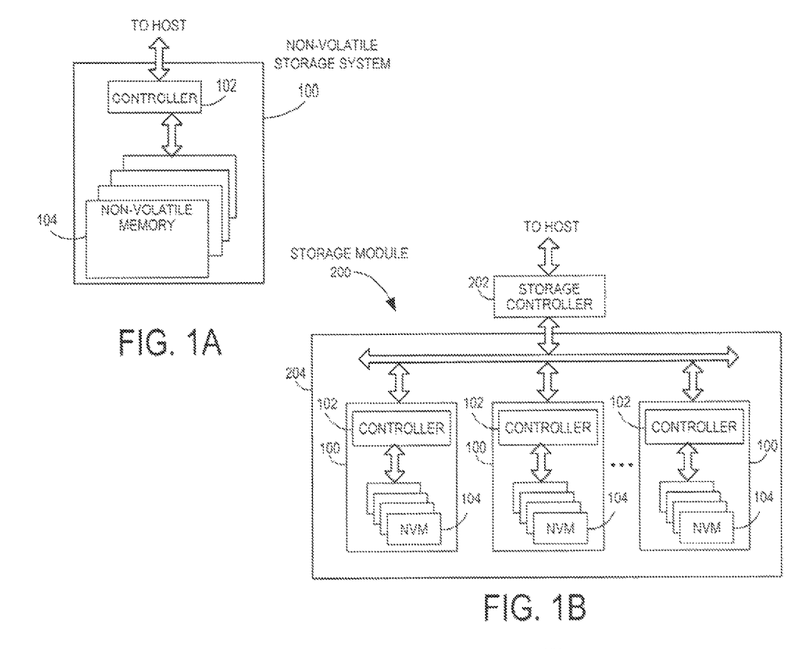
FIG. 1A is a block diagram of a data storage device of an embodiment.
FIG. 1B is a block diagram illustrating a storage module of an embodiment.
Figure 1C:
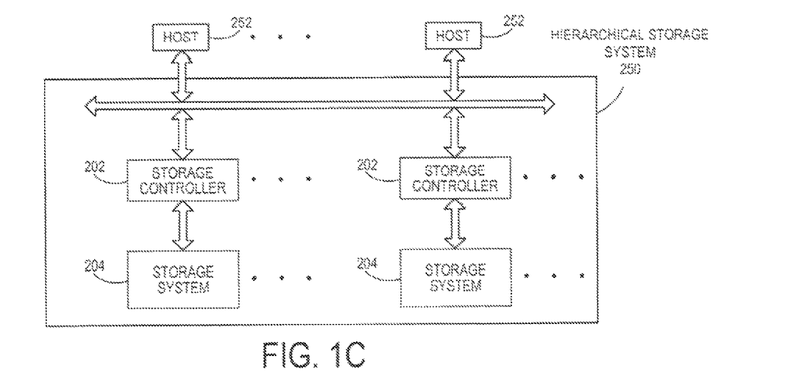
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
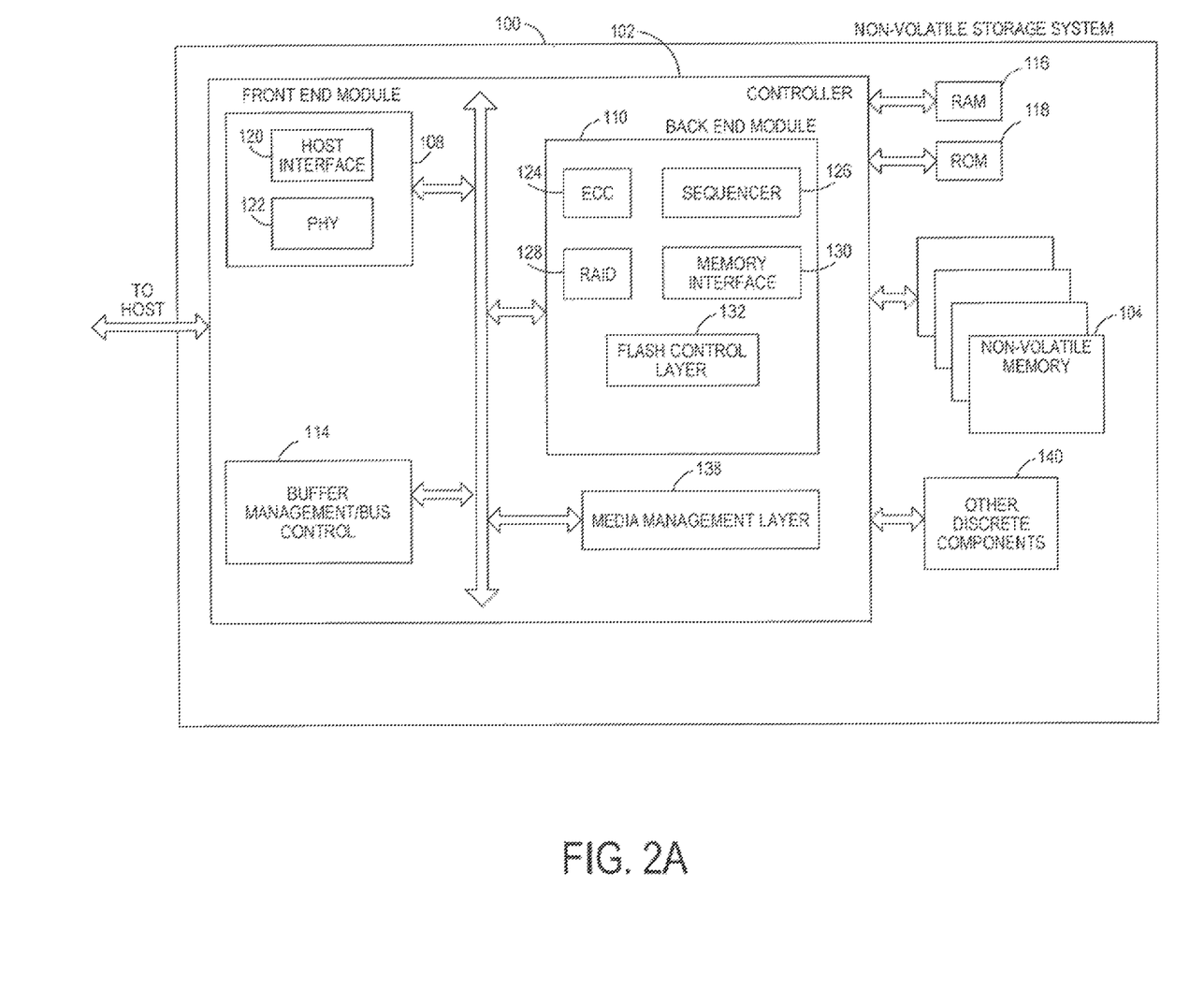
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
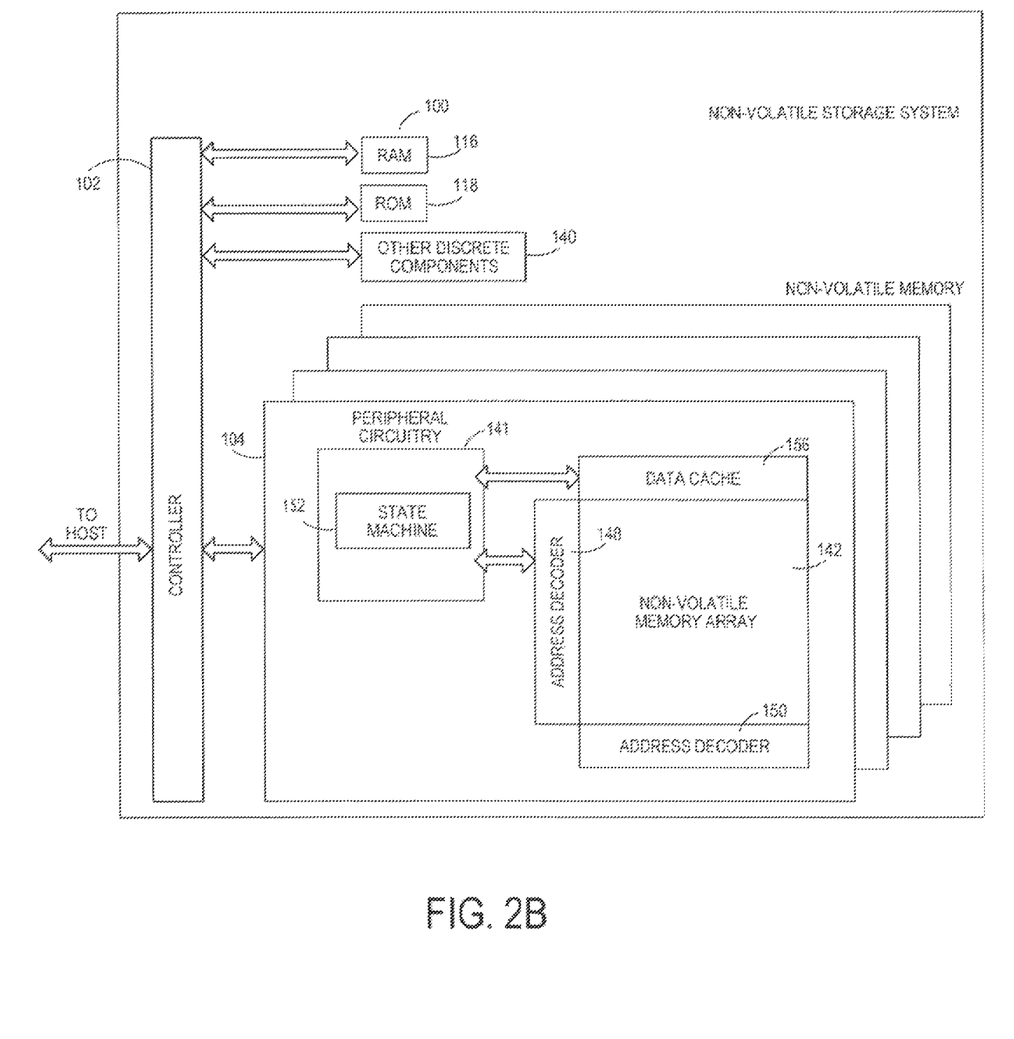
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 2C:
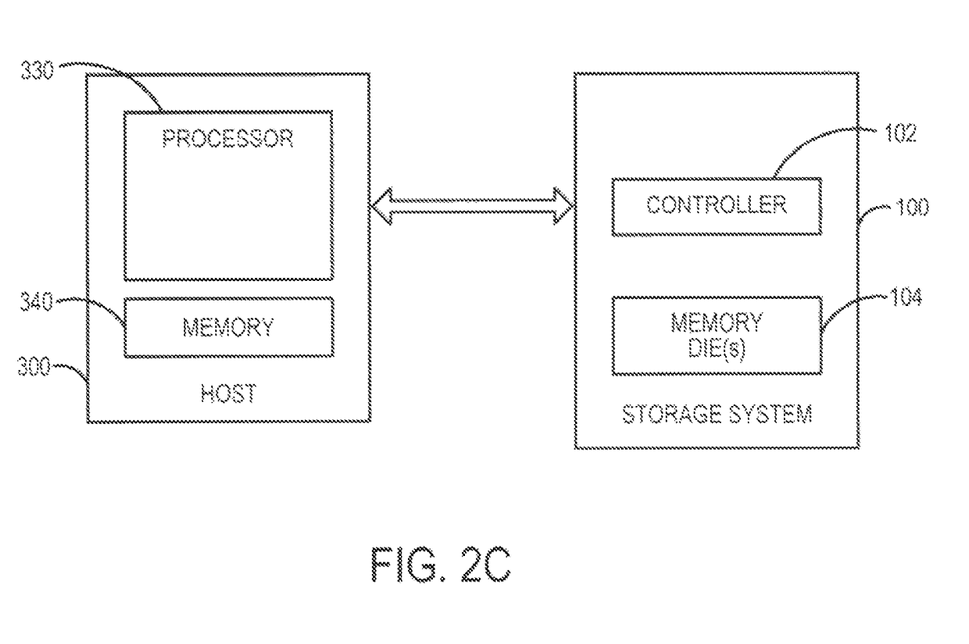
FIG. 2C is a block diagram of a host and data storage device of an embodiment.

Turning again to the drawings, FIG. 2C is a block diagram of a host 300 and data storage device 100 of an embodiment. The host 300 can take any suitable form, including, but not limited to, a computer, a mobile phone, a tablet, a wearable device, a digital video recorder, a surveillance system, etc.

The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 3:
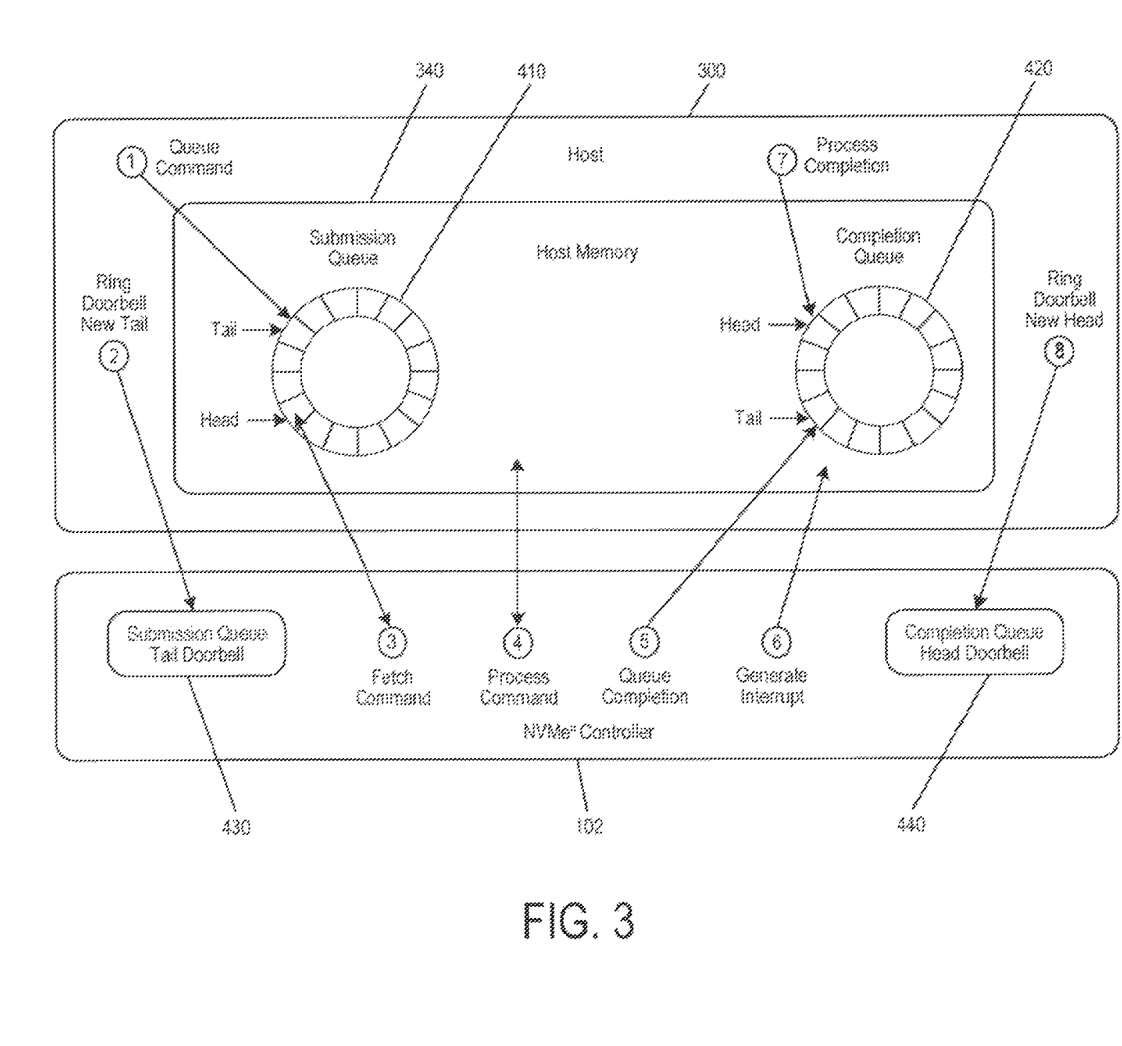
FIG. 3 is a block diagram of a host and a data storage device of an embodiment operating under the Non-Volatile Memory Express (NVMe) specification.

In one embodiment, the data storage device 100 and host 300 operate under the Non-Volatile Memory Express (NVMe) specification. FIG. 3 is a diagram of an example system of an embodiment. It should be noted that this is merely one example, and other implementations can be used. As shown in FIG. 3, in this embodiment, the memory 340 in the host 300 comprises a submission queue 410 paired with a completion queue 420. Also, the controller 102 in the data storage device 100 comprises a submission queue tail doorbell register 430 and a completion queue head doorbell register 440. The operation of these components will be explained below.

NVMe is based on a paired submission and completion queue mechanism. Commands are placed by host software into the submission queue (SQ) 410. Completions are placed into the associated completion queue (CQ) 420 by the controller 102 of the data storage device 100. In general, submission and completion queues 410, 420 are allocated in the host memory 340. In one implementation, the submission queues and completion queues 410, 420 may have a 1:1 correlation; in other implementations, the submission queues 410 and completion queues 420 do not have a 1:1 correlation.

For initialization, the host 300 may notify the data storage device 100 of the submission queue(s) 410 and completion queue(s) 420 by sending information, such as the base address for each queue 410, 420 to the data storage device 100. In that regard, each submission queue 410 has a corresponding completion queue 420. When the submission queue 410 and the completion queue 420 are resident in the host 300, the host 300 can send information to the data storage device 100 in order for the data storage device 100 to determine the locations of the submission queue 410 and the completion queue 420 in the host 300. In a specific implementation, the host 300 sends a command indicating the creation of the submission queue 410 and the completion queue 420.

The submission queue 410 may be based on a ring buffer, with a head pointer and a tail pointer. After creating the submission queue(s) 410 and notifying the data storage device 100 about the created submission queue(s) 410, the host 300 can write a command (or several commands) to the submission queue 410 (act 1). In one implementation, the data storage device 100 is unaware that the host 300 has updated the submission queue, since the host 300 updated its own memory 340. The host 300 can write to a submission queue tail doorbell register 430 in the data storage device 100 to signal to the data storage device 100 that the host 300 queued one or more commands in this specific submission queue 410 (act 2). The writing to the submission queue tail doorbell register 430 may take one of several forms. In one way, the host 300 indicates a new tail for the submission queue 410, thereby indicating the number of commands written to the submission queue 410. Thus, since the data storage device 100 is aware of the base address for the submission queue 410, the data storage device 100 only needs to know the tail address to indicate the number of new commands written to the submission queue 410. After a command (or a set of commands) is processed, the data storage device 100 then sets the new head of the submission queue 410 accordingly, so that the tail pointer may represent an "offset" from the head pointer. In another way, the host 300 indicates a number of commands written to the submission queue 410. In practice, each submission queue 410 has a corresponding submission queue tail doorbell register 430 in the data storage device 100, so that when the host 300 updates a particular doorbell register (correlated to a particular submission queue), the data storage device 100 can determine, based on the doorbell register, which particular submission queue has been updated.

After the data storage device 100 is notified of command(s) on the submission queue 410 and before the data storage device 100 fetches the command(s), the data storage device 100 is aware that there are command(s) pending in the submission queue 410. In the general case, there may be several submission queues (with potentially many pending commands in the several submission queues). Thus, the data storage device's controller 102 may arbitrate between the various submission queues to select the particular submission queue from which to fetch the command(s).

Responsive to determining which particular submission queue 410 from which to fetch the command(s), the data storage device 100 fetches the command(s) from the particular submission queue 410 (act 3). In practice, the data storage device 100 may access the base address of the particular submission queue 410 plus the pointer on the current head pointer implemented in the host 300.

The data storage device 100 then processes the command (e.g., by parsing the command and determining the steps to execute the command (e.g., read/write/etc.)) (act 4). After completing the data transfer associated with the command, the data storage device's controller 102 sends a completion message to the relevant completion queue 420 (act 5). At the initialization phase, the host 300 associates submission queues 410 with completion queues 420, so that the host 300 is aware of commands that are completed in the submission queue 410 based on which completion queue 420 the data storage device 100 writes to. The completion message may contain information as to the processing of the command(s), such as whether the command was completed successfully or whether there was an error when executing the command.

At this point, the host 300 is unaware that the data storage device 100 posted to the completion queue 420. This is due to the data storage device 100 causing data to be written to the completion queue 420. In that regard, the data storage device 100 can notify the host 300 that there has been an update to the completion queue. In particular, the data storage device 100 posts an interrupt to the host 300 (act 6). Responsive to receiving the interrupt, the host 300 determines that there are one or more completion entries pending for the host 300 in this completion queue 420 and processes the entries in the completion queue 420. After the host 300 processes the entries from the completion queue, the host 300 notifies the data storage device 100 of the entries that the host 300 processed from the completion queue 420 (act 7). This may be performed by updating a completion queue head doorbell register 440 indicative to the data storage device 100 that the host 300 processed one or more entries from the completion queue 420. Responsive to updating the completion queue head doorbell register 440, the data storage device 100 updates the head of the completion queue 420 (act 8). Given the new head, the data storage device 100 is aware as to which entries in the completion queue 420 have already been processed by the host 300 and may be overwritten.

Figure 4:
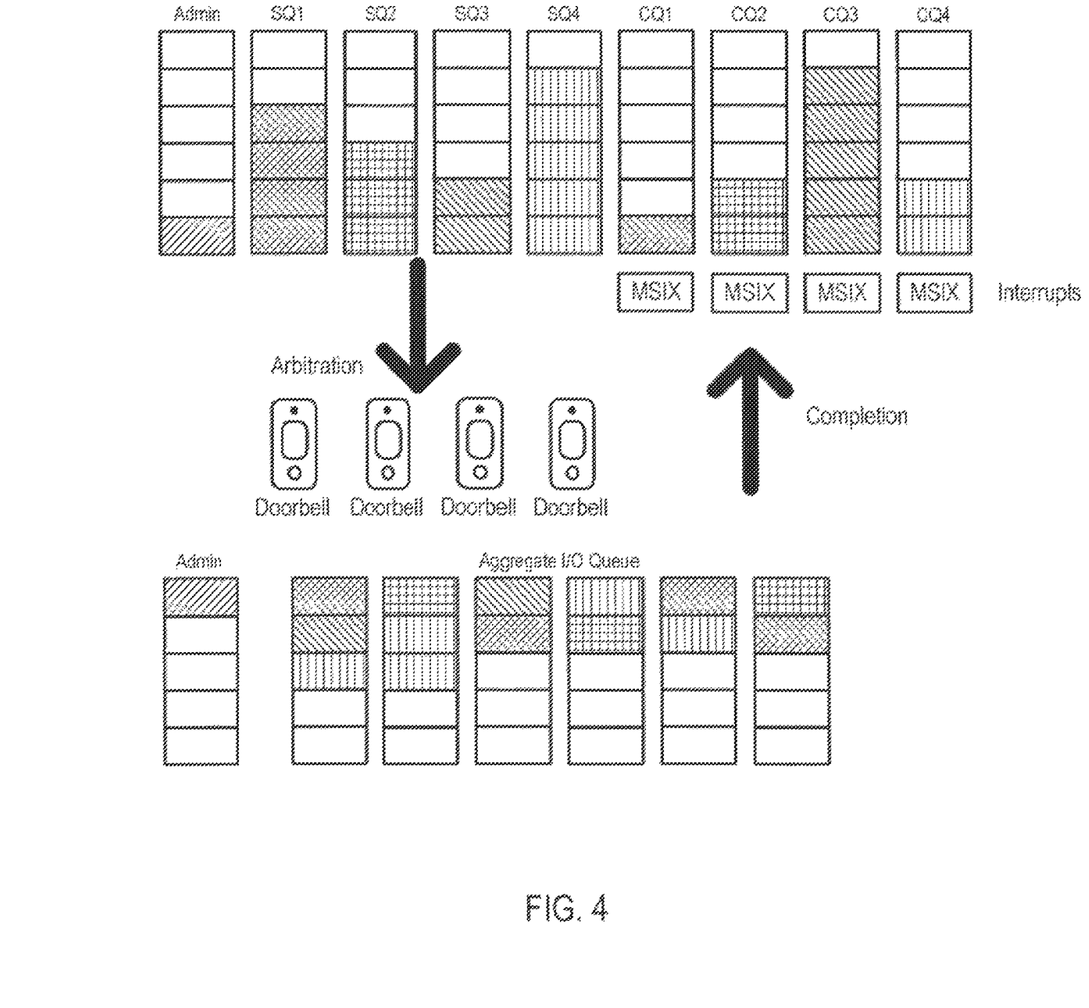
FIG. 4 is an illustration of a multi-queue NVMe environment of an embodiment.

While the above example was described in terms of a single submission queue and a single completion queue, it should be noted that multiple queues can be used and that the NVMe specification provides for the use of an asynchronous multi-queue protocol. As shown in FIG. 4, when multiple queues are used, an arbitration mechanism can be used to determine which commands from which submission queue are placed in various positions in various aggregate input/output (I/O) queues in the data storage device 100.

The data storage device 100 may issue an interrupt immediately upon each command completion, which minimizes the perceived round-trip latency of a command. However, each interrupt causes the corresponding host central processing unit (CPU) core to stop whatever it was doing and call an interrupt service routine, thus increasing CPU load and potentially reducing overall system performance. In high-performance client environments, there may be a need for balance between interrupt frequency and overall system responsiveness. This is especially important in CPU-centric workloads, such as games, where it is important or critical that the data storage device not cause a bottleneck. While the NVMe specification provides an interface that allows a host to specify desired interrupt coalescing parameters, such as a maximum number of command completions to coalesce and/or a time period that should be used to govern the frequency of completions, such coalescing may not be sufficient to address the problems noted above in gaming (and other) environments.

Games tend to use a number of storage resources during active play. Generally, these are represented as individual files, which are then grouped into more-complex structures or in an internal file system (such as a ZIP or other container-based file format). Game logic will try to predict these accesses in advance to avoid frame drops or jitter caused by the indeterminism of storage. In current games, all of the resources for a given screen or level will be read at once into host memory (e.g., DRAM), since current games are optimized for hard disk drive (HDD) storage and cannot achieve real-time streaming from a data storage device.

Figure 5:
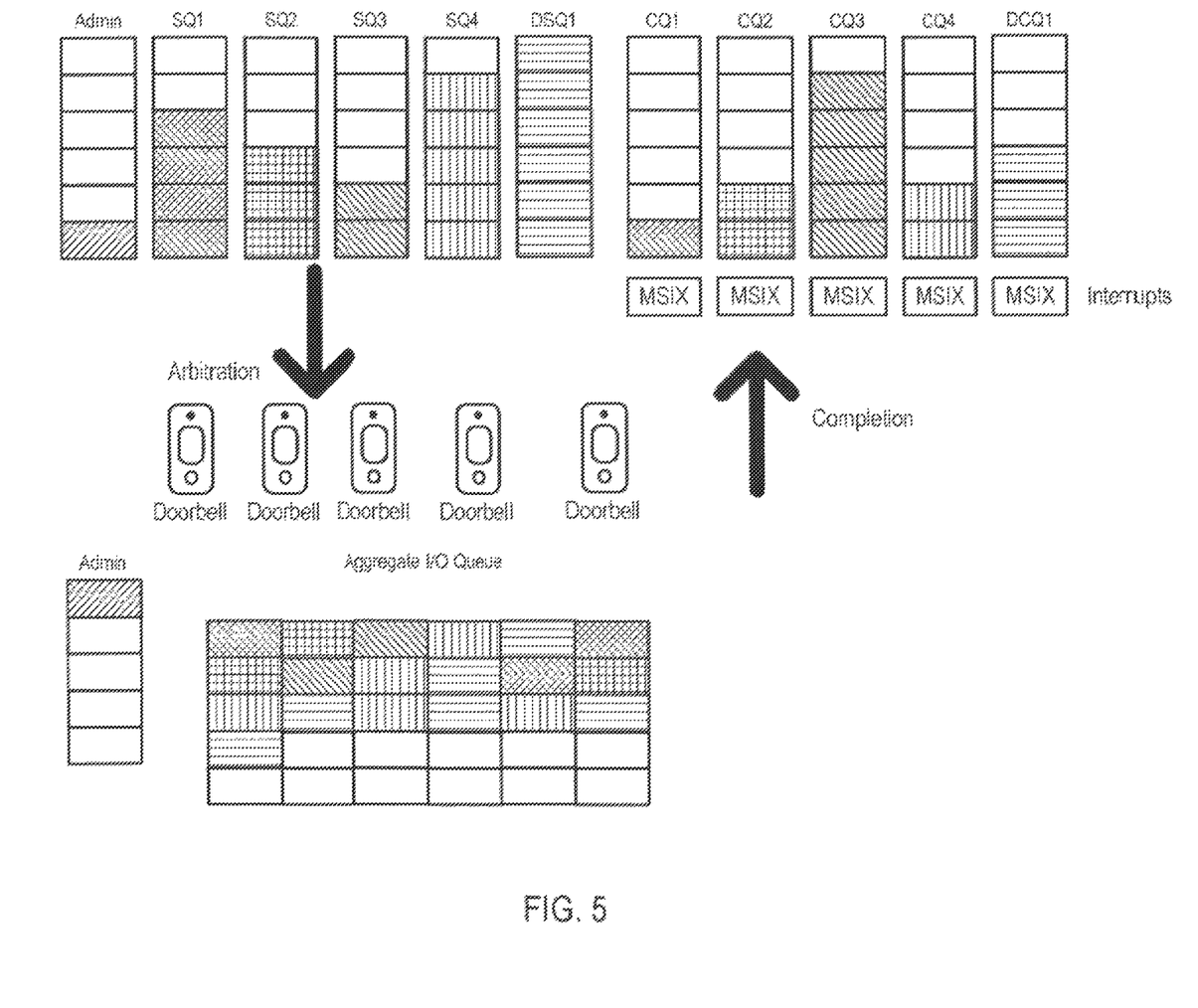
FIG. 5 is an illustration of a use of dedicated queues of an embodiment.

An optimized approach to data storage access can include using dedicated queues that bypass the usual file system overhead and read directly from the data storage device, loading files into memory just before they are needed. These queues may have the same priority as other queues or may be prioritized above other queues using weighted-round-robin arbitration. FIG. 5 (with additional queues DSQ1 and DCQ1) illustrates this approach.

While this architecture eliminates the need for long level loads, it does raise potential CPU bottlenecks if there are constant interrupts for each completion of what might be many small accesses. Interrupt coalescing provides a solution for this, but the current methods are not fine-tuned to the needs of a gaming engine.

The following paragraphs present embodiments that can address this problem by triggering interrupts when they are needed, without causing interrupt storms or delaying needed completions. More specifically, these embodiments can be used to coalesce interrupts around specific read events (e.g., reading an end-of-file extent or queue-based signals) rather than fixed thresholds. It should be noted that, in some embodiments, these reads are from dedicated (e.g., game-centric) queues, and the coalescing occurs only from the dedicated queues and not from main operating system. It should also be noted that, in some embodiments, dedicated queues used for this purpose bypass the file system and, as such, are not permitted to write to the memory 104 at all (i.e., only read commands are used in these queues).

As noted above, in one embodiment, coalescing interrupts can be triggered by a read of an end-of-file extent. Extent-based interrupts can be useful in the gaming context. As noted above, assets tend to be stored in files, which may be collected into a virtual file system. Files are variably sized, but the host 300 does not need parts of an asset and will not benefit from an interrupt on a partial file read. So, in this embodiment, an interrupt is released only when an asset is completely read. This can be derived in any suitable way, such as (a) host signaling of volume extent maps (maps of file offsets to logical block address (LBA) ranges) or internal analysis of extent maps using unassisted hinting techniques and (b) sending interrupts on reads that are shorter than a recommended read size, which would typically indicate "end of file" (additional interrupts may be released at specific intervals in order to avoid situations where every single file is exactly aligned to the recommended size).

Host signaling of volume extent maps can be accomplished using a Dataset Management integral read command. While this command is defined in the NVMe standard, it is not generally used to define interrupt coalescing thresholds. Use of this command in this manner is permitted in the NVMe standard but is not mandated or implied by the current specification. The host 300 may send an extent map using this command prior to streaming a large batch of assets. The extent map may be volatile or persistent. If deploying unassisted hinting (e.g., as described in U.S. Pat. No. 10,007,442), the data storage device 100 can internally analyze file system structures when reads to certain logical block addresses (LBAs) are detected and create an internal extent map for the LBAs in a specific range.

Figure 6:
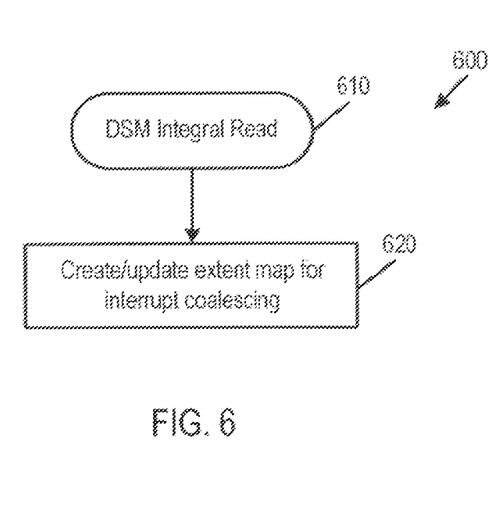
FIGS. 6-8 are flow charts that illustrate a hint-based coalescing method of an embodiment.
Figure 7:
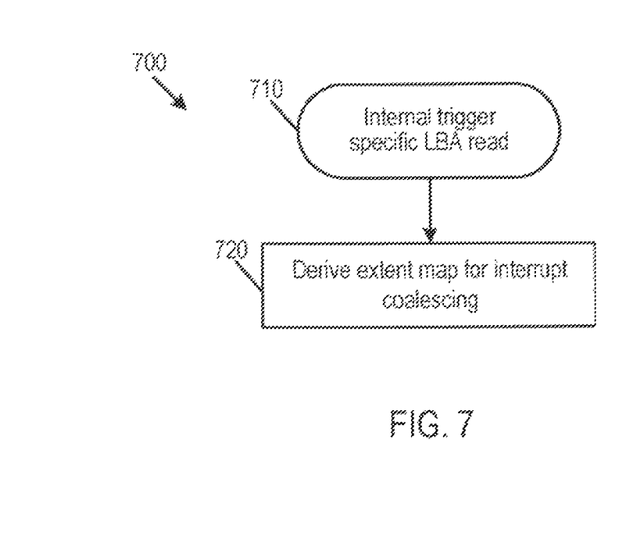
Figure 8:
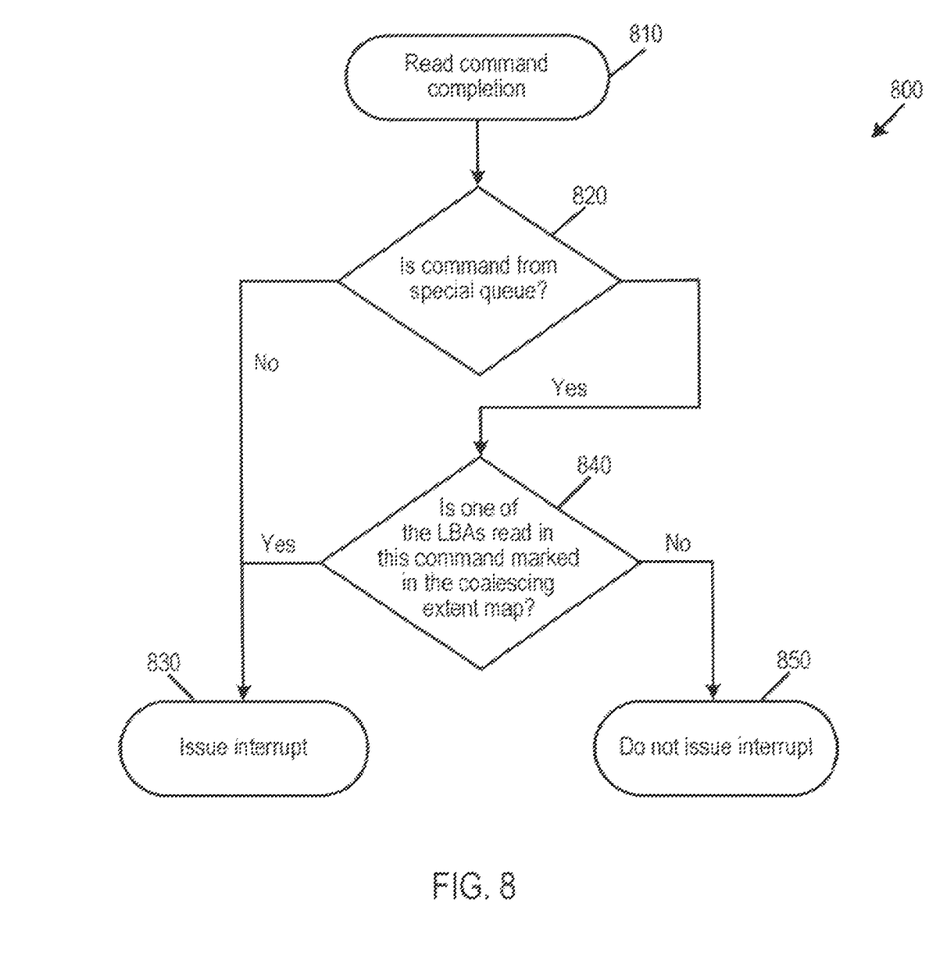

In both the host signaling and the unassisted hinting approaches, the controller 102 in the data storage device 100 can maintain a list of trigger LBAs. When these LBAs are read, the controller 102 can send an interrupt. The list may be incorporated in an existing logical-to-physical (L2P) address data structure (e.g., table) or stored separately in a volatile manner. The list may also be a reverse list of LBAs that are considered to be part of the same extent and, thus, should not trigger an interrupt. A read of any other LBA can trigger the interrupt. FIGS. 6-8 are flow charts that illustrated this hint-based coalescing approach.

As shown in the flow chart 600 in FIG. 6, in response to receiving a dataset management (DSM) integral read command (act 610), the controller 102 in the data storage device 100 creates/updates an extent map for interrupt coalescing (act 620). As shown in the flow chart 700 in FIG. 7, in response to an internal trigger-specific LBA read (act 710), the controller 102 derives an extent map for interrupt coalescing (act 720). As shown in the flow chart 800 in FIG. 8, upon completion of a read command (act 810), the controller 102 determines if the command was from a special queue (act 820). If the command was not from a special queue, the controller 102 issues the interrupt (act 830). However, if the command was from a special queue, the controller 102 determines if one of the LBAs read in the command is marked in the coalescing extent map (act 840). If one of the LBAs read in the command is marked in the coalescing extent map, the controller 102 issues the interrupt (act 830). However, if one of the LBAs read in the command is not marked in the coalescing extent map, the controller 102 does not issue the interrupt (act 850).

In another embodiment, an asset being completely read can be derived from host-signaled barriers. In this embodiment, no interrupt is sent on a read command. Since these queues are only used for read commands, any other command can be used to indicate that a completion interrupt is desired. The NVMe standard defines a no-op combination of Dataset Management flags, where all of the options are set to zero. This command, when inserted into a stream of reads, can trigger a completion interrupt. This method is illustrated in the flow chart 900 in FIG. 9.

Figure 9:
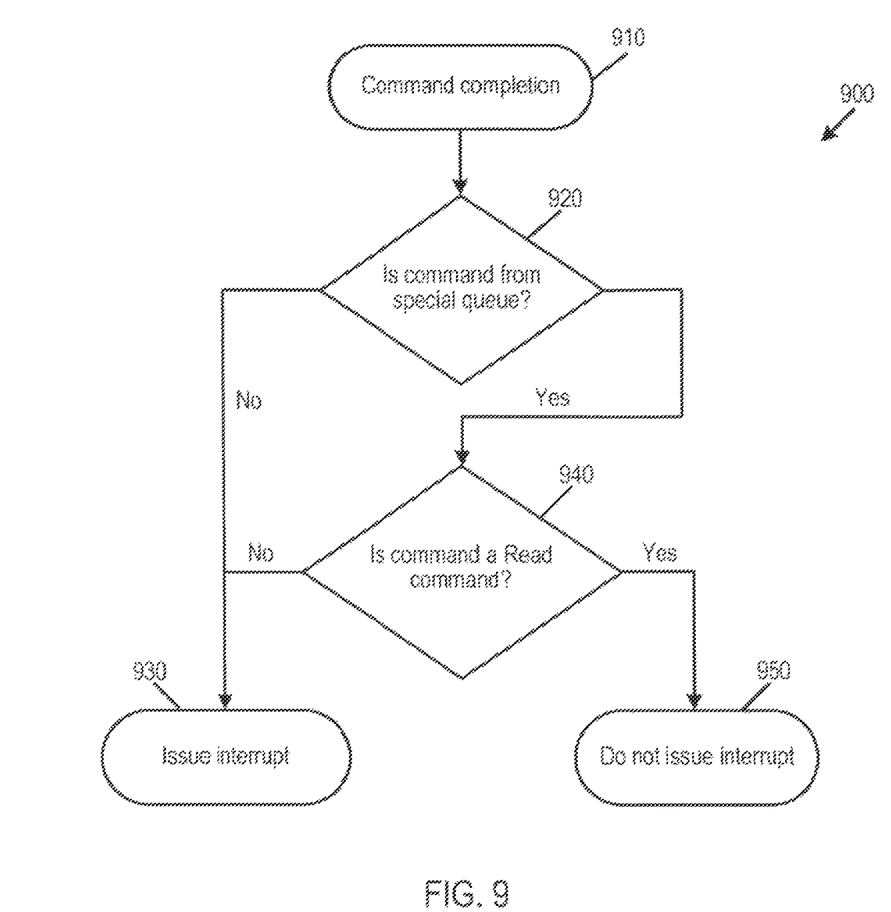
FIG. 9 is a flow chart of a host-signaled interrupt coalescing method of an embodiment.

As shown in FIG. 9, upon command completion (act 910), the controller 102 determines if the command is from a special queue (act 920). If the command is not from a special queue, the controller 102 issues an interrupt (act 930). If the command is from a special queue, the controller 102 determines if the command is a read command (act 940). If the command is not a read command, the controller 102 issues an interrupt (act 930). However, if the command is a read command, the controller 102 does not issue an interrupt (act 950).

In another embodiment, read commands may be completed out of order, thus creating a situation where an interrupt-triggering command is completed before the read commands that preceded it in the queue. Therefore, an additional step can be taken: the interrupt-triggering command can cause the controller 102 to wait until previously-outstanding read commands are completed before completing itself and triggering the interrupt. This is shown in the flow chart 1000 in FIG. 10.

Figure 10:
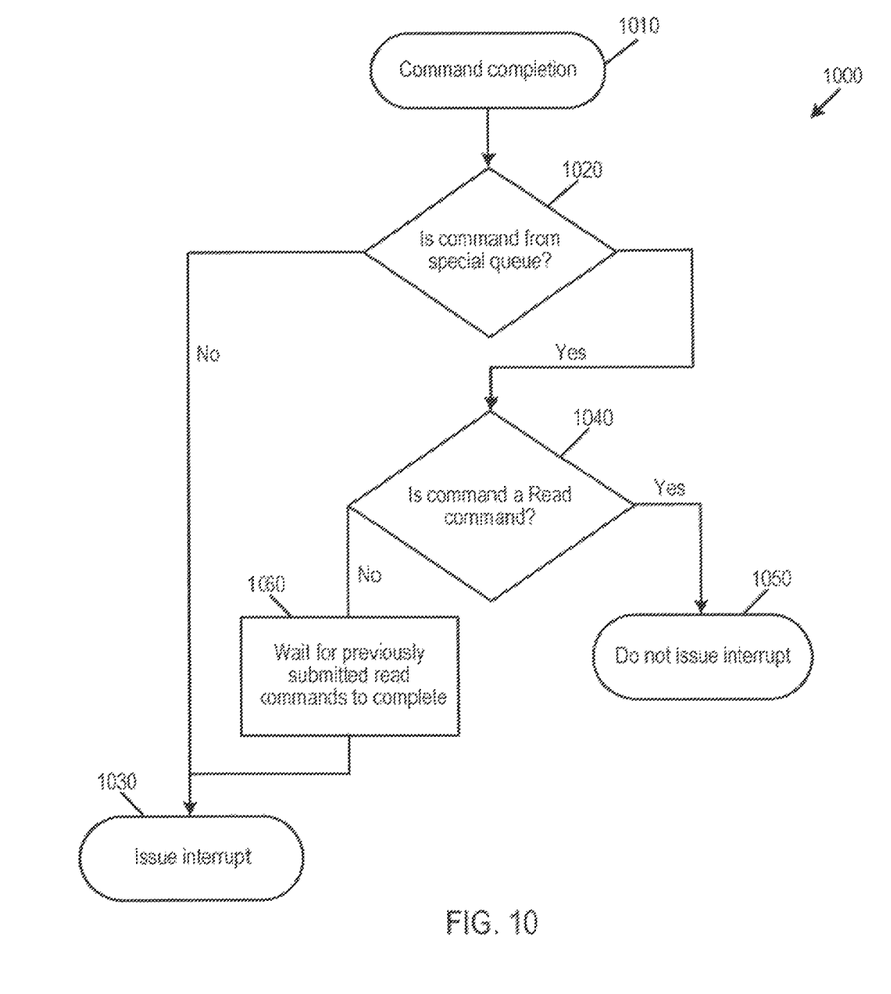
FIG. 10 is a flow chart of an ordered interrupt coalescing trigger method of an embodiment.

As shown in FIG. 10, upon command completion (act 1010), the controller 102 determines if the command is from a special queue (act 1020). If the command is not from a special queue, the controller 102 issues an interrupt (act 1030). If the command is from a special queue, the controller 102 determines if the command is a read command (act 1040). If the command is not a read command, the controller 102 waits for a previously-submitted read commands to complete (act 1060) and then issues an interrupt (act 1030). However, if the command is a read command, the controller 102 does not issue an interrupt (act 1050).

It should be noted that this method can use any non-read command or can be restricted to specific commands, such as the Dataset Management no-op command. Typically, a device implementation will advise the host 300 to use a harmless command sequence, such as no-op, but a vendor-specific command or even illegal command can be used instead to trigger the interrupt.

In another embodiment, the controller 102 of the data storage device 100 can also take into consideration interrupt coalescing parameters set by the host 300 using Set Features and add the recommended time or number of commands to the delay before triggering an interrupt. This will allow the host 300 to predictively interleave no-op commands that trigger an interrupt at file boundaries or other locations without creating a need for precise synchronization at the device side. Also, the conditions under which the controller 102 coalesces interrupts for the dedicated host application queue can be different from the conditions under which the controller 102 coalesces interrupts for the operating system queues.

There are several advantages associated with these embodiments. For example, by using these embodiments, the data storage device can optimize interrupt coalescing flows for game workloads, increasing responsiveness in games and reducing CPU load.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising: a memory; and a controller configured to: execute a plurality of read commands read from a submission queue in a host; write a plurality of completion messages to a completion queue in the host; and coalesce interrupts to inform the host that the plurality of completion messages was written to the completion queue; and send the coalesced interrupts to the host in response to reading a reverse list of logical block addresses that are considered part of a same extent that is not to trigger sending an interrupt; wherein the submission queue and the completion queue are dedicated to read commands from a host application and are separate from a submission queue and a completion queue for read and write commands from an operating system of the host.

2. The data storage device of claim 1, wherein the plurality of predetermined logical block addresses is specified by the host.

3. The data storage device of claim 1, wherein the plurality of predetermined logical block addresses is received from the host via a dataset management integral read command.

4. The data storage device of claim 1, wherein the controller is further configured to identify the plurality of predetermined logical block addresses by creating an internal extent map.

5. The data storage device of claim 1, wherein the plurality of predetermined logical block addresses is listed in a logical-to-physical address data structure.

6. The data storage device of claim 1, wherein the controller is further configured to send the coalesced interrupts to the host in response to reading data that is smaller than a predetermined read size.

7. The data storage device of claim 1, wherein the controller is further configured to:
avoid automatically sending an interrupt to inform the host that a completion message was written to the completion queue dedicated to the host application, and
send the coalesced interrupts to the host only after receiving a command from the host that triggers the sending of the coalesced interrupts.

8. The data storage device of claim 7, wherein the controller is further configured to send the coalesced interrupts only after receiving the command from the host and after completing any previously-submitted read commands from the submission queue dedicated to the host application.

9. The data storage device of claim 7, wherein the command from the host comprises a non-read command.

10. The data storage device of claim 7, wherein the command from the host comprises a no-op command.

11. The data storage device of claim 7, wherein the command from the host comprises a vendor-specific command.

12. The data storage device of claim 7, wherein the command from the host comprises an illegal command.

13. The data storage device of claim 1, wherein the controller is further configured to take into consideration an interrupt coalescing parameter set by the host when coalescing the interrupts.

14. The data storage device of claim 1, wherein:
the controller is further configured to coalesce interrupts to inform the host that a plurality of completion messages was written to the completion queue for read and write commands from the operating system of the host; and
interrupts to inform the host that the plurality of completion messages was written to the completion queue dedicated to the host application are coalesced differently from interrupts to inform the host that the plurality of completion messages was written to the completion queue for read and write commands from the operating system of the host.

15. The data storage device of claim 1, wherein the host application comprises a game application.

16. The data storage device of claim 1, wherein the memory comprises a three-dimensionalmemory.

17. A method comprising:
performing the following in a data storage device in communication with a host comprising a submission queue and a completion queue:
executing a plurality of read commands from the submission queue, wherein the plurality of read commands is for parts of an asset of a game application on a host;
writing a plurality of completion messages to the completion queue; and
delaying sending interrupts to inform the host that the plurality of completion messages was written to the completion queue until a predetermined read event occurs, wherein the predetermined read event comprises reading all of the parts of the asset.

18. The method of claim 17, wherein the predetermined read event comprises reading an end-of-file extent.

19. The method of claim 17, wherein the submission queue and the completion queue are dedicated to read commands from an application running on a host and are separate from a submission queue and a completion queue for read and write commands from an operating system of the host.

20. A data storage device comprising:
a memory;
means for executing a plurality of read commands read from a submission queue in a host;
means for writing a plurality of completion messages to a completion queue in the host;
means for coalescing interrupts to inform the host that the plurality of completion messages was written to the completion queue;
means for avoiding automatically sending an interrupt to inform the host that a completion message was written to the completion queue dedicated to the host application; and
means for sending the coalesced interrupts to the host only after receiving a command from the host that triggers the sending of the coalesced interrupts;
wherein the submission queue and the completion queue are dedicated to read commands from a host application and are separate from a submission queue and a completion queue for read and write commands from an operating system of the host.

* * * * *